United States Patent
Atchison et al.

(10) Patent No.: US 10,788,231 B2
(45) Date of Patent: Sep. 29, 2020

(54) FAULT CONDITION MANAGEMENT FOR HEATING, VENTILATION, AND AIR CONDITIONING (HVAC) SYSTEMS

(71) Applicant: Johnson Controls Technology Company, Auburn Hills, MI (US)

(72) Inventors: Shaun B. Atchison, Wichita, KS (US); Noel A. Grajeda-Trevizo, Newton, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 17 days.

(21) Appl. No.: 15/920,728

(22) Filed: Mar. 14, 2018

(65) Prior Publication Data

US 2019/0264939 A1 Aug. 29, 2019

Related U.S. Application Data

(60) Provisional application No. 62/635,772, filed on Feb. 27, 2018.

(51) Int. Cl.
*F24F 11/38* (2018.01)
*F24F 11/52* (2018.01)
(Continued)

(52) U.S. Cl.
CPC .............. *F24F 11/38* (2018.01); *F24F 11/52* (2018.01); *F24F 11/56* (2018.01); *F24F 11/64* (2018.01);
(Continued)

(58) Field of Classification Search
None
See application file for complete search history.

(56) References Cited

U.S. PATENT DOCUMENTS 6,851,621 B1 * 2/2005 Wacker .............. G05D 23/1905
236/51
7,308,384 B2 12/2007 Shah et al.
(Continued)

FOREIGN PATENT DOCUMENTS

WO 2017181080 A1 10/2017

OTHER PUBLICATIONS

"Installation Manual R-410A Outdoor Split-System Heat Pump", 2016, Johnson Controls, 5156631-UIM-B-0616, pp. 11-26 (Year: 2016).*

(Continued)

*Primary Examiner* — Mohammad Ali
*Assistant Examiner* — David Earl Ogg
(74) *Attorney, Agent, or Firm* — Fletcher Yoder, P.C.

(57) ABSTRACT

Presently disclosed is a fault condition management system of a heating, ventilation, and air conditioning (HVAC) system. The system includes a controller having a user interface with a display and a lockout status indicator. The controller is configured to determine that the HVAC system is in a plurality of fault conditions and to individually present, on the display of the user interface, a respective fault code corresponding to each respective fault condition of the plurality of fault conditions in a repeating loop. Each respective fault code is presented for a fault code presentation duration followed by a rest duration. The controller is configured to control illumination of the lockout status indicator during the fault code presentation duration of each respective fault code to indicate a respective lockout status of the corresponding respective fault condition.

23 Claims, 6 Drawing Sheets

(51) Int. Cl.
   *F24F 11/56* (2018.01)
   *G05B 15/02* (2006.01)
   *F24F 11/65* (2018.01)
   *F24F 11/88* (2018.01)
   *F24F 11/64* (2018.01)

(52) U.S. Cl.
   CPC .............. *F24F 11/65* (2018.01); *F24F 11/88* (2018.01); *G05B 15/02* (2013.01)

(56) References Cited

U.S. PATENT DOCUMENTS

| | | |
|---|---|---|
| 7,878,009 B2 | 2/2011 | Doberstein et al. |
| 8,326,790 B2 | 12/2012 | Macek et al. |
| 8,689,572 B2 | 4/2014 | Evans et al. |
| 9,037,303 B2 | 5/2015 | Leise et al. |
| 9,500,366 B2 | 11/2016 | Kadah et al. |
| 2006/0179341 A1* | 8/2006 | Harrod .................. G05B 15/02 714/4.2 |
| 2011/0125328 A1* | 5/2011 | Lingrey ................. G05B 15/02 700/276 |
| 2013/0158718 A1 | 6/2013 | Barton et al. |
| 2013/0345881 A1* | 12/2013 | Leise ....................... F24F 1/00 700/276 |
| 2016/0217674 A1 | 7/2016 | Stewart et al. |
| 2017/0301192 A1 | 10/2017 | Green |

OTHER PUBLICATIONS

Carrier, "Gemini Select 38APS025-065,38APD025-130 Commercial Air-Cooled Condensing Units with ComfortLink Version 6.X Controls 50/60 Hz", 2015, Carrier Corporation, Form 38AP-2T, pp. 162 (Year: 2015).*

* cited by examiner

FAULT CONDITION MANAGEMENT FOR HEATING, VENTILATION, AND AIR CONDITIONING (HVAC) SYSTEMS

CROSS-REFERENCE TO RELATED APPLICATION

This application is a Non Provisional Application claiming priority to U.S. Provisional Application No. 62/635,772, entitled "FAULT CONDITION MANAGEMENT FOR HEATING, VENTILATION, AND AIR CONDITIONING (HVAC) SYSTEMS," filed Feb. 27, 2018, which is hereby incorporated by reference in its entirety for all purposes.

BACKGROUND

The present disclosure relates generally to heating, ventilation, and air conditioning (HVAC) systems, and more particularly, to fault condition management in HVAC systems.

Residential, light commercial, commercial, and industrial systems are used to control temperatures and air quality in buildings. To condition a building, a HVAC system may circulate a refrigerant through a refrigerant circuit between an evaporator where the refrigerant absorbs heat and a condenser where the refrigerant releases heat. The refrigerant flowing within the refrigerant circuit is generally formulated to undergo phase changes within the normal operating temperatures and pressures of the HVAC system so that quantities of heat can be exchanged by virtue of the latent heat of vaporization of the refrigerant to provide conditioned air to the buildings. In certain instances, a HVAC system may be configured as a heat pump system or an air conditioning system.

When a portion of a HVAC system fails or operates outside of a predetermined operational window, a controller of the HVAC system may detect the issue and enter a fault condition. When the HVAC system enters a fault condition, the controller may restrict or modify operation of the HVAC system and/or provide an indication of the fault condition. For example, depending on the nature of the fault condition, the controller may enable normal operation of the HVAC system, prevent a compressor of the HVAC system from activating, or completely disable operation of the HVAC system. Additionally, information regarding the fault condition of the HVAC unit can be presented to a service technician to direct the technician to address issues to restore the HVAC system to normal operation.

SUMMARY

In an embodiment, a fault condition management system of a heating, ventilation, and air conditioning (HVAC) system is disclosed. The system includes a controller having a user interface with a display and a lockout status indicator. The controller is configured to determine that the HVAC system is in a plurality of fault conditions and to individually present, on the display of the user interface, a respective fault code corresponding to each respective fault condition of the plurality of fault conditions in a repeating loop. Each respective fault code is presented for a fault code presentation duration followed by a rest duration. The controller is also configured to control illumination of the lockout status indicator during the fault code presentation duration of each respective fault code to indicate a respective lockout status of the corresponding respective fault condition.

A heating, ventilation, and air conditioning (HVAC) controller includes a user interface having a display and a lockout status indicator, as well as processing circuitry communicatively coupled to the user interface and configured to execute instructions stored in a memory. These instructions cause the controller to: determine that an associated HVAC unit has entered a plurality of fault conditions, and present, on the display of the user interface, a respective fault code corresponding to each respective fault condition of the plurality of fault conditions in a looping serialized manner. Each respective fault code is presented for a fault code presentation duration followed by the display being deactivated for a rest duration. Additionally, the instructions cause the controller to control illumination of the lockout status indicator during the fault code presentation duration of each respective fault code to indicate a respective lockout status that corresponds to each respective fault code.

In another embodiment, a controller for a heating, ventilation, and air conditioning (HVAC) system includes a tangible medium storing instruction executable by a processor. The instructions include instructions to determine that the HVAC system has entered a plurality of fault conditions; and instructions to present, on a display associated with the controller, a respective fault code corresponding to each respective fault condition of the plurality of fault conditions in a serialized manner, wherein each respective fault code is presented for a fault code presentation duration, and wherein the display is deactivated for a rest duration between each fault code presentation duration. The instructions further include instructions to control illumination of a lockout status indicator associated with the controller during each fault code presentation duration in a manner that indicates a respective lockout status that corresponds to each respective fault code presented on the display.

DETAILED DESCRIPTION

A portion of a HVAC system can fail or otherwise operate in an abnormal manner, resulting in a fault condition. For example, at start-up, a controller of a HVAC system may determine that a tonnage setting of the HVAC system is incorrect. As such, in this example, the controller and/or HVAC system may enter into a particular fault condition that is indicative of a configuration error in the HVAC system. Furthermore, it is possible for the controller and/or HVAC system to enter multiple fault conditions during operation. For example, if, in addition to the incorrect tonnage, the controller determines that a signal from a temperature sensor is outside of a predetermined acceptable range of signals, the HVAC system may also enter a second fault condition that is indicative of a temperature sensor failure. Indeed, the controller and/or HVAC system may enter into any suitable number of fault conditions based on abnormal or unexpected operation of the various components of the HVAC system.

With the foregoing in mind, present embodiments are directed toward a fault management system of a HVAC system. The disclosed fault management system enables the HVAC system to identify a plurality of fault conditions of the HVAC system, to individually display each of a plurality of fault codes corresponding to the fault conditions in a serialized manner, and to simultaneously indicate a lockout status associated with each displayed fault code. Additionally, the disclosed fault management system includes a user interface that is designed for use by a service technician. The disclosed user interface is configured to individually display, to the service technician, a fault code and a lockout status for each fault condition of the HVAC system according to a predetermined pattern. Further, the user interface includes a plurality of user input devices configured to receive input from the service technician to enable the service technician to address and clear certain fault conditions of the HVAC system. As such, the presently disclosed technique enables efficient presentation of fault condition information to the service technician in a manner that avoids the inefficiencies of accumulated reports or summarized fault notification lists.

Figure 1:
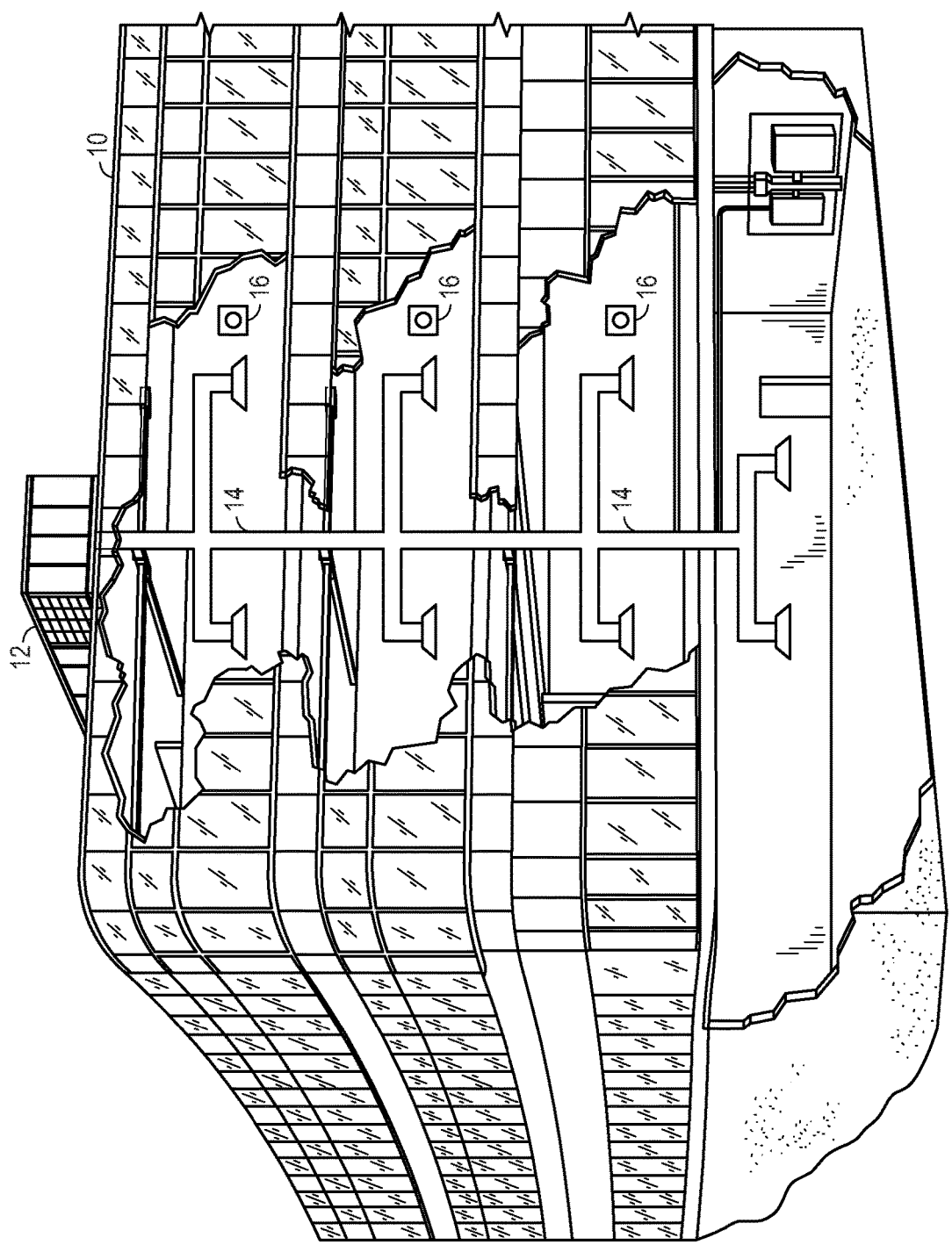
FIG. 1 is an illustration of an embodiment of a commercial or industrial HVAC system, in accordance with present techniques.

Turning now to the drawings, FIG. 1 illustrates a heating, ventilation, and air conditioning (HVAC) system for building environmental management that may employ one or more HVAC units. In the illustrated embodiment, a building 10 is air conditioned by a system that includes a HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
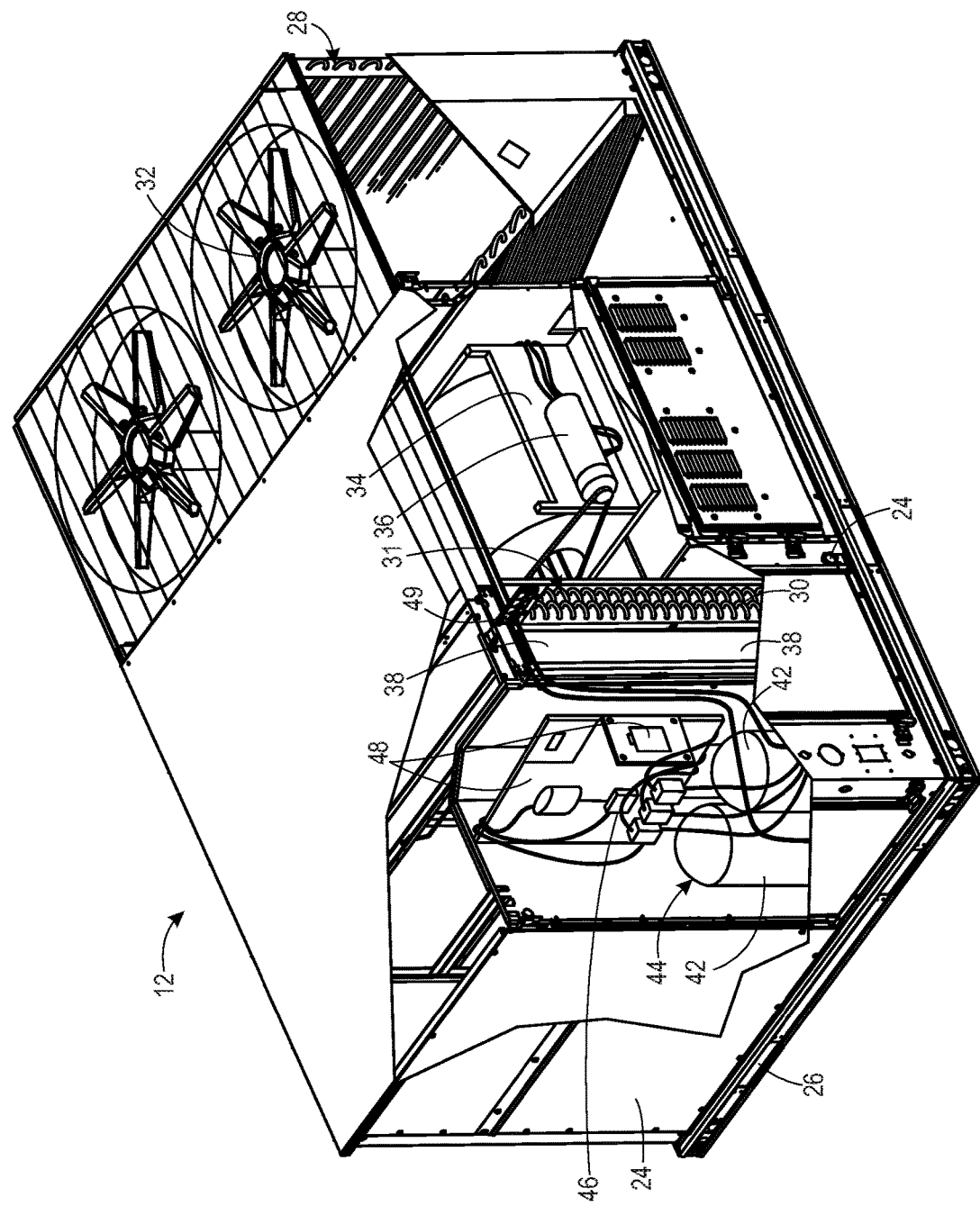
FIG. 2 is an illustration of an embodiment of a packaged unit of the HVAC system, in accordance with present techniques.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking mechanisms such as rain from leaking into the building 10.

The HVAC unit 12 includes heat exchangers 28 and 30 in fluid communication with one or more refrigeration circuits. Tubes within the heat exchangers 28 and 30 may circulate refrigerant through the heat exchangers 28 and 30. For example, the refrigerant may be R-410A. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
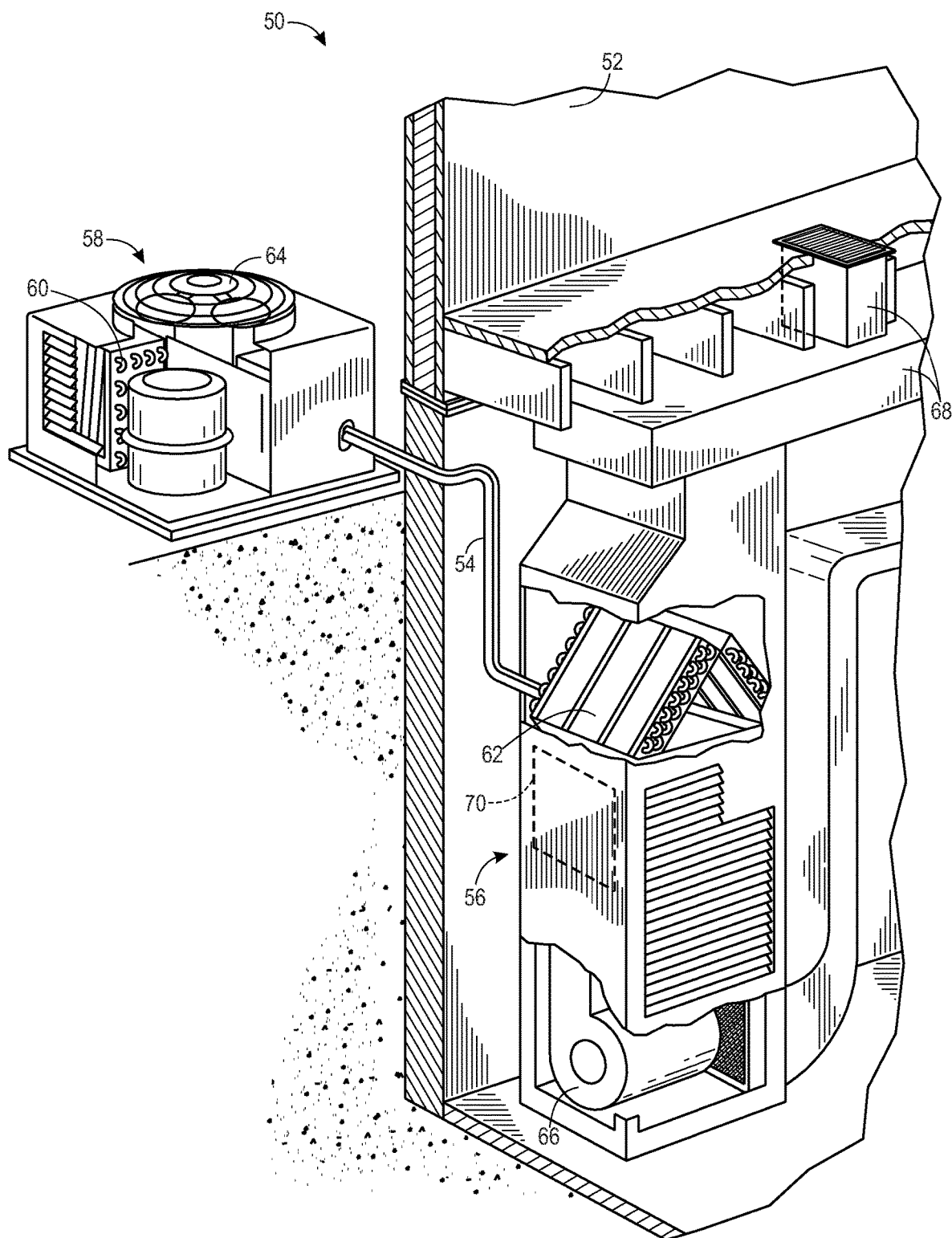
FIG. 3 is an illustration of an embodiment of a split system of the HVAC system, in accordance with present techniques.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger that is separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
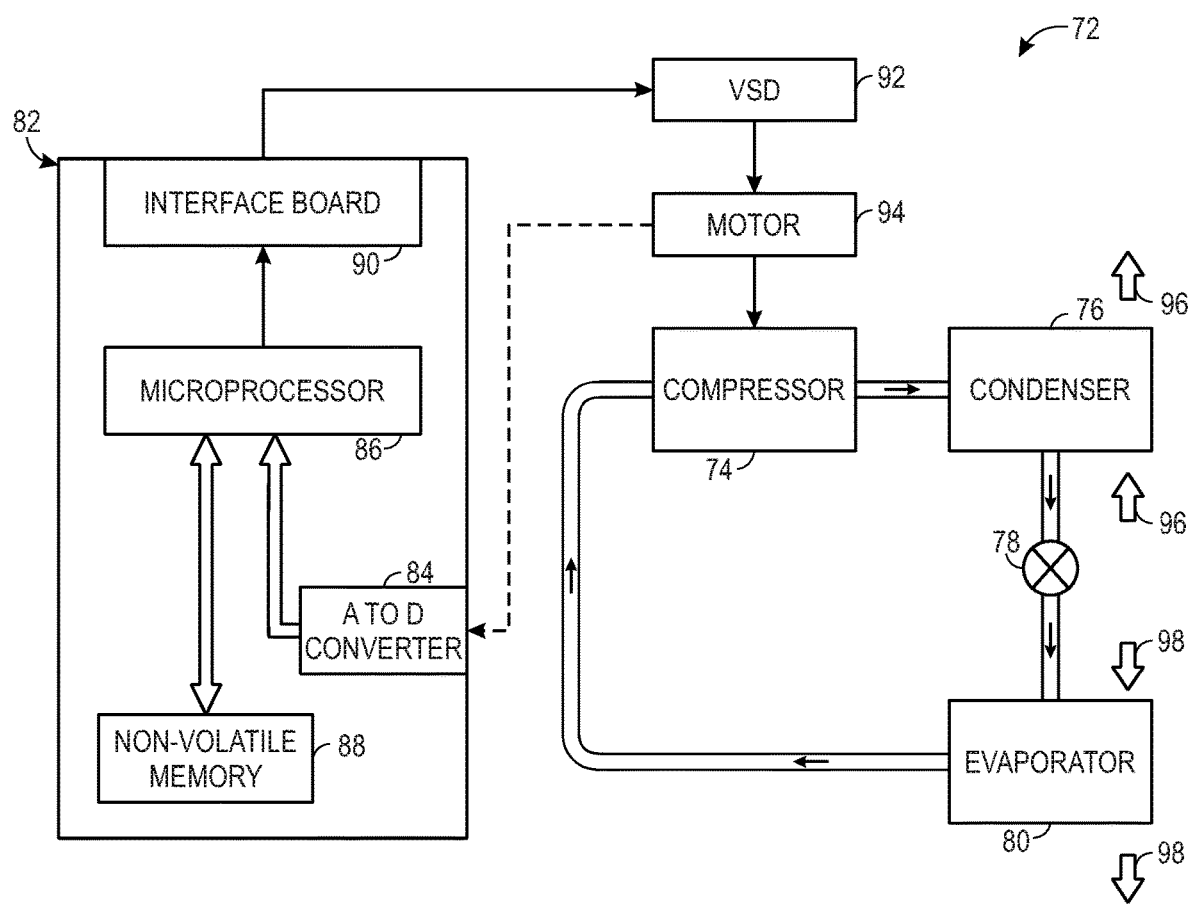
FIG. 4 is a schematic diagram of an embodiment of a refrigeration system of the HVAC system in an air conditioner configuration, in accordance with present techniques.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
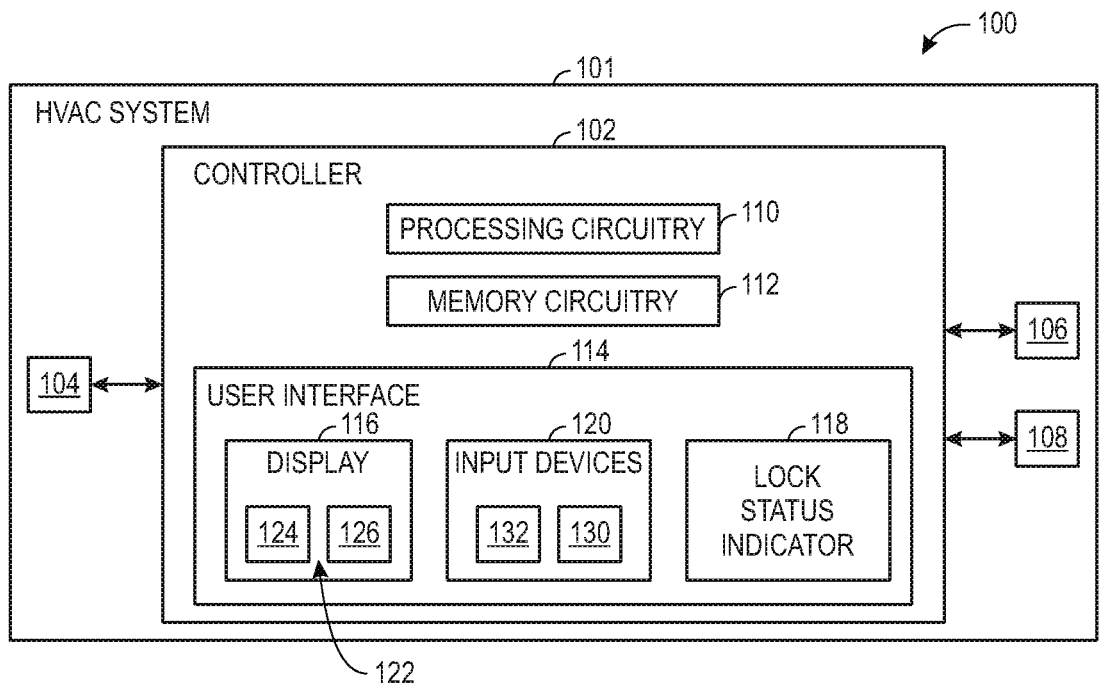
FIG. 5 is a schematic diagram of an embodiment of a fault management system of the HVAC system, in accordance with present techniques.

FIG. 5 illustrates an embodiment of the disclosed fault management system 100 of a HVAC system 101, in accordance with the present approach. The illustrated embodiment of the fault management system 100 includes a controller 102, which may be at least a component of the control board 48 or the control panel 82 discussed above, in certain embodiments. For the illustrated embodiment, the controller 102 generally controls operation of the HVAC system 101, providing control signals to directly or indirectly activate and deactivate the compressor 74, the fan 64, the fan 66, and any other component of the HVAC system 101 based on instructions received from a communicatively coupled thermostat device 104. The controller 102 may be installed within the indoor HVAC unit 56, within the outdoor HVAC unit 58, or disposed elsewhere within the interior of the building 10. In certain embodiments, the controller 102 may be designed to operate in a HVAC system 101 in which the vapor compression system 72 is a heat pump system or an air conditioning system, depending on the configuration of the controller 102.

Additionally, the controller 102 is communicatively coupled to receive information from, and to provide instructions to, other components of the HVAC system 101. For example, the controller 102 may be installed as part of the indoor HVAC unit 56 and may be communicatively coupled to any suitable number of sensors 106 and/or devices 108 installed throughout the HVAC system. For example, in certain embodiments, the controller 102 may be communicatively coupled to receive data from sensors 106 (e.g., pressure sensors, temperature sensors, humidity sensors) disposed throughout the HVAC system 101. In certain embodiments, the controller 102 is a main or principle controller of the HVAC system 101, and the controller 102 is communicatively coupled to other control circuitry devices 108, such as a slave or secondary controller installed in the outdoor HVAC unit 58. As such, the controller 102 generally receives data regarding the operation of the HVAC system 101 from various sensors 106 and/or various devices 108 disposed throughout the system.

The controller 102 also includes processing circuitry 110 and memory circuitry 112, which may correspond to the microprocessor 86 and the non-volatile memory 88 of the control panel 82 of FIG. 4, in certain embodiments. The processing circuitry 110 may include a processor, such as a microprocessor or a central processing unit (CPU), that can execute computer-readable instructions for controlling the components of the HVAC system 101. Moreover, the processing circuitry 110 may include multiple microprocessors, one or more "general-purpose" microprocessors, one or more special-purpose microprocessors, and/or one or more application specific integrated circuits (ASICS), or some combination thereof. The memory circuitry 112 may include a volatile memory, such as random access memory (RAM), and/or a nonvolatile memory, such as read-only memory (ROM). The memory circuitry 112 may store a variety of information and may be used by the controller 102 for various purposes. For example, the memory circuitry 112 may store processor-executable instructions including firmware or software for the processing circuitry 110 to execute to provide the functionality set forth herein.

In addition, the illustrated embodiment of the controller 102 includes a user interface 114. As illustrated, the user interface 114 includes a display 116, a lockout status indicator 118, and a plurality of user input devices 120. As such, the disclosed user interface 114 may be described as a hardware-based user interface, as opposed to a software-based or graphical user interface. In certain embodiments, the user interface 114 may be built into the same circuitry (e.g., on the same control board) as the controller 102, such that the display 116, lockout status indicator 118, and the plurality of user input devices 120 are integrated into a surface of the controller 102. In other embodiments, the user interface 114 may be disposed separate from, and communicatively coupled to, the controller 102. In certain embodiments, the display 116 includes an array 122 of seven-segment displays units. In particular, for the illustrated embodiment, the display 116 includes an array 122 having a first seven-segment display unit 124 and a second seven-segment display unit 126. While additional seven-segment display units may be used in a display 116 of another embodiment, it is recognized that maintaining a low number of seven-segment display units (e.g., less than three) limits aspects of the manufacturing cost and complexity of the controller 102. As such, in certain embodiments, the display 116 may be used to provide information using only a first seven-segment display unit 124 and a second seven-segment display unit 126. As discussed below, for the illustrated embodiment, the processing circuitry 110 of the controller 102 identifies all of the fault conditions of the HVAC system, and then uses the display 116 to individually present a corresponding two-digit fault code for each fault condition on the two seven-segment displays 124 and 126.

In certain embodiments, the lockout status indicator 118 may be a lamp or light. For example, in the illustrated embodiment, the lockout status indicator 118 is a light-emitting diode (LED). For the illustrated embodiment, the lockout status indicator 118 is illuminated based on the lockout status of a fault condition of the HVAC system. That is, as each fault code is individually presented on the display 116 of the user interface 114 in a serialized (e.g., one-at-a-time) fashion, the lockout status indicator 118 may be illuminated in different manners to indicate the lockout status of the fault condition associated with the currently presented fault code. For example, when a fault condition does not have an associated soft-lockout or hard-lockout status, the lockout status indicator 118 may be illuminated solid to indicate a non-lockout status. By way of a specific example, in an embodiment, when the controller 102 receives only one indication of the fault condition from a communicatively coupled component, then the controller 102 may not assign a corresponding soft-lockout or hard lockout status to the fault condition, resulting in a non-lockout status associated with the fault condition. As such, while the fault code that corresponds to the non-lockout status is presented on the display, the lockout status indicator 118 may be illuminated solid.

However, once the controller 102 receives a second indication of the fault condition from the communicatively coupled component, then the controller 102 may assign a soft-lockout status to the fault condition. For example, when a fault condition has an associated soft-lockout, the lockout status indicator 118 may be configured to blink twice. In certain embodiments, a soft-lockout status or condition may involve the controller 102 preventing or blocking the activation of the compressor 74 until the soft-lockout status is cleared by a service technician using the user interface 114 or by an hour passing with the underlying fault condition cleared. Additionally, when the controller 102 receives a third indication of the fault condition from a communicatively coupled component, or receives multiple soft-lockout statuses within a predefined time window, then the controller 102 may assign a hard-lockout status to the fault condition. In certain embodiments, when a fault condition has an associated hard-lockout status, the lockout status indicator 118 may be configured to blink three times. In certain embodiments, a hard-lockout status or condition may involve the controller 102 preventing or blocking the activation of the compressor 74 until the hard-lockout status is cleared by the service technician, for example, using the user interface 114 or by cycling power to the HVAC system 101 or controller 102. Accordingly, the controller 102 enables using the combination of the display 116 and the lockout status indicator 118 to individually convey the nature and severity of each of a plurality of fault conditions to the service technician in a serialized fashion.

As mentioned, the user interface 114 of the controller 102 includes a plurality of user input devices 120. For the illustrated embodiment, the controller 102 includes a plurality of dipswitches 130 that may be configured (e.g., by a service technician at the time of manufacture or installation of the HVAC system) to indicate to the controller 102 a tonnage of the HVAC system. Additionally, the illustrated embodiment includes at least one push button input device 132. For example, a service technician can press the push button input device 132 for different durations to provide different signals (e.g., having different respective signal characteristics) that convey different instructions to the controller 102. That is, in certain embodiments, the service technician may quickly press and release the push button input device 132 to cause the controller 102 to present, on the display 116, information regarding the HVAC system 101, such as tonnage or other configuration data, when no fault conditions are present. In certain embodiments, when fault conditions are present, the service technician may quickly press and release the push button input device 132 to cause the display 116 to present information regarding the fault conditions of the HVAC system 101, wherein each of the fault codes corresponding to the fault conditions is presented one after another, in a serialized manner, on the display 116. In certain embodiments, the technician can press and hold the push button input device 132 for a predetermined threshold time period (e.g., 6 seconds, 10 seconds) to clear certain fault conditions and to clear certain lockout statuses. For example, as discussed in greater detail below, when the technician presses and holds the push button input device 132 for the first threshold time period, then one or more fault codes and/or associated lockout statuses may be cleared.

Figure 6:
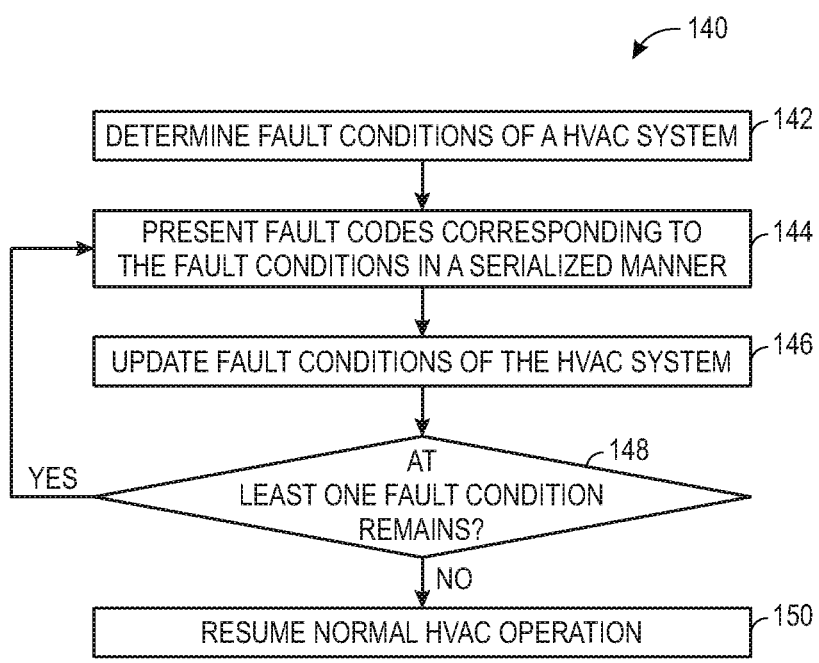
FIG. 6 is a flow diagram representing an embodiment of a process whereby the fault management system manages fault conditions of the HVAC system, in accordance with present techniques.

FIG. 6 is a flow diagram representing an embodiment of a process 140 whereby the fault management system 100 manages faults conditions of the HVAC system 101, in accordance with present techniques. The illustrated process 140 may be stored in the memory circuitry 112 and executed by the processing circuitry 110 of the controller 102, or other suitable processing circuitry of the HVAC system 101. The illustrated process 140 begins with the controller 102 determining one or more fault conditions of the HVAC system 101, as indicated in block 142. For example, at start-up, the controller 102 may determine a plurality of fault conditions based on data received from communicatively coupled sensors 106 and/or devices 108 of the HVAC system 101.

Continuing through the illustrated embodiment, the controller 102 then presents fault codes corresponding to the fault conditions in a serialized manner, as indicated in block 144. The serialized presentation of block 144 is discussed in greater detail with respect to FIG. 7. After presenting the fault codes, the controller 102 updates the fault conditions of the HVAC system 101, as indicated in block 146. For example, in block 146, the controller 102 may collect data from the communicatively coupled sensors 106 and/or devices 108 to determine whether the previously detected fault conditions persist or have been resolved, as well as determine whether new fault conditions have arisen. Furthermore, in block 146, the controller 102 may receive input from the service technician via the plurality of user input devices 120 to clear or remove one or more fault conditions or associated lockout statuses, as discussed in the example below.

After updating the fault conditions of the HVAC system 101, the controller 102 determines whether at least one fault condition remains, as indicated in decision block 148. When the controller 102 determines that at least one fault condition remains, the controller 102 returns to block 144, and once again presents the fault codes corresponding to the at least one fault condition. When the controller 102 determines in block 148 that no further fault conditions remain, then the controller 102 resumes normal HVAC operation, as indicated in block 150.

Figure 7:
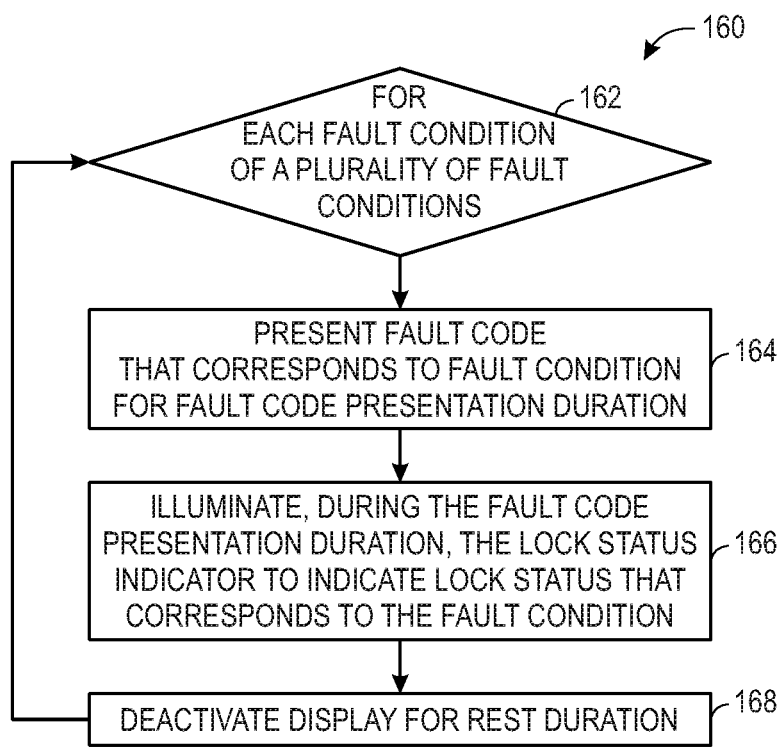
FIG. 7 is a flow diagram representing an embodiment of a process whereby the fault management system presents fault conditions of the HVAC system, in accordance with present techniques.

FIG. 7 is a flow diagram representing an embodiment of a process 160 whereby the fault management system 100 presents fault conditions of the HVAC system 101 to a service technician, in accordance with present techniques. The illustrated process 160 generally corresponds to the actions described in block 144 of FIG. 6. The illustrated process 160 may be stored in the memory circuitry 112 and executed by the processing circuitry 110 of the controller 102, or other suitable processing circuitry of the HVAC system 101. That is, the HVAC system 101 is designed to generally operate in the manner described with respect to FIG. 7 in accordance with present embodiments.

In FIG. 7, as indicated in block 162, the illustrated embodiment of the process 160 involves performing a series of steps for each fault condition of the HVAC system. For each fault condition, the controller 102 presents, on the display 116, the fault code that corresponds to the fault condition, as indicated in block 164. Further, the fault code is presented on the display 116 for a predetermined fault code presentation duration, which may be 5 seconds, 10 seconds, or another suitable duration. As the controller 102 presents the fault code, as indicated in block 166, in conjunction, the controller 102 illuminates the lockout status indicator 118 in a particular way to indicate the lockout status that corresponds to the fault condition, as indicated in block 166. For example, as mentioned, the controller 102 may illuminate the lockout status indicator 118 in different manners (e.g., solid, blinking twice, blinking three times) to indicate the lockout status of the fault condition that corresponds to the currently presented fault code during the fault code presentation duration. Subsequently, at the end of the fault code presentation duration, the controller 102 deactivates the display 116 for a predetermined rest duration, such as 2 seconds, as indicated in block 168, before repeating the process 160 again for the next fault condition.

In an example, during operation of the HVAC system 101, the controller 102 of the fault management system 100 determines that the HVAC system 101 has entered into a plurality of fault conditions. For this example, the active fault conditions include: a "high discharge temperature" fault condition that corresponds to a fault code "15", a "discharge temperature sensor failure" fault condition that corresponds to a fault code "13", and a "configuration error" fault condition that corresponds to a fault code of "30". As such, during an active call for compressor operation (e.g., during an active call for conditioning), the display 116 of the user interface 114 of the controller 102 presents each of the fault codes that correspond to the various fault conditions based on a chronological order in which the fault condition was entered. For this example, controller 102 first presents the fault code that corresponds to the earliest of the fault conditions on the display 116 for the predetermined fault code presentation duration. In conjunction therewith, the controller 102 illuminates the lockout status indicator 118 to indicate the lockout status associated with the fault condition that corresponds to the presented fault code. Then, the controller 102 deactivates the display 116 for the predetermined rest duration. These steps are repeated until the fault codes that correspond with each of the fault conditions are presented in chronological order, and then the process is subsequently repeated.

As such, for this example, during an active call for compressor activation, the controller 102 causes the display 116 to present "30" for 5 seconds, followed by a 2 second rest delay, and then present "15" for 5 seconds, followed by a 2 second rest delay, and then present "13" for 5 seconds, followed by a 2 second rest delay, and then repeat the process. Additionally, the lockout status indicator 118 blinks three times as the "30" is presented on the display 116, indicating a hard-lockout status associated with the configuration error, and blinks twice as each of the "13" and "15" are presented on the display 116, indicating soft-lockout statuses associated with the discharge temperature sensor failure and the high discharge temperature fault.

Continuing through this example, a service technician can use the plurality of user input devices 120 to clear the fault conditions as the underlying issues in the HVAC system 101 are addressed. For example, to address the configuration error, the service technician may adjust the position of the one or more of the plurality of dip switches 130 to adjust the tonnage to a suitable setting for the HVAC system 101. Subsequently, the service technician can press and hold the push button input device 132 for a predetermined duration (e.g., 6 seconds, 10 seconds) while there is not a call for compressor operation, which instructs the controller 102 to redetect the configuration of the controller 102. This may involve the controller 102 reading, from the plurality of dipswitches 130, the updated tonnage setting. In other embodiments, this redetection may additionally or alternatively involve updating information stored in the memory circuitry 112 of the controller 102 to match a current configuration of the controller 102. For example, this detection may involve detecting whether a reversing valve is electrically coupled to the controller 102 to determine whether the HVAC system 100 is a heat pump system or an air conditioning system, and then updating a baseline configuration stored in the memory circuitry 112 of the controller 102 accordingly.

Continuing through this example, once the configuration error is cleared, the controller 102 presents, on the display 116, "15" for 5 seconds, followed by a 2 second rest delay, and then presents "13" for 5 seconds, followed by a 2 second rest delay, and then repeats the process. Additionally, the lockout status indicator 118 blinks twice as the "13" and "15" are presented on the display 116, indicating soft-lockout statuses associated with the discharge temperature sensor failure and the high discharge temperature fault conditions. Next, the service technician replaces or repairs the discharge temperature sensor, and subsequently, presses and holds the push button input device 132 for the predetermined duration while there is not a call for compressor operation. In response, the controller 102 detects that the discharge temperature sensor is suitably coupled and clears the discharge temperature sensor fault condition, as well as the associated soft-lockout status.

Continuing through this example, once the discharge temperature sensor fault condition is cleared, the controller 102 presents, on the display 116, "15" for 5 seconds, followed by a 2 second rest delay, and then repeats the process. Additionally, the lockout status indicator 118 blinks twice times as the "15" is presented on the display 116, indicating a soft-lockout status associated with the high discharge temperature fault. Once the discharge temperature falls within an acceptable range, the service technician presses and holds the push button input device 132 for the predetermined duration while there is not a call for compressor operation. In response, the controller 102 detects that the discharge temperature is suitably within a predetermined operating range and clears the high discharge temperature fault condition, as well as the associated soft-lockout status. At this point, since there are no remaining fault conditions, the controller 102 and HVAC system 101 resumes normal operation.

While only certain features and embodiments of the present disclosure have been illustrated and described, many modifications and changes may occur to those skilled in the art, such as variations in sizes, dimensions, structures, shapes and proportions of the various elements, values of parameters, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A fault condition management system of a heating, ventilation, and air conditioning (HVAC) system, comprising:
a controller having a user interface with a display, a push button input device, and a lockout status indicator, wherein the controller is configured to:
determine that the HVAC system is in a plurality of fault conditions;
individually present, on the display of the user interface, a respective fault code corresponding to each respective fault condition of the plurality of fault conditions in a repeating loop in response to receiving a first signal from the push button input device during a first time period after the controller has received a signal indicative of a request for compressor operation from a thermostat, wherein each respective fault code is presented for a fault code presentation duration followed by a rest duration between each respective fault code presentation duration;
control illumination of the lockout status indicator synchronized with the fault code presentation duration of each respective fault code to indicate a respective lockout status of the corresponding respective fault condition;
in response to receiving a second signal from the push button input device during a second time period after the controller has not received the signal indicative of the request for compressor operation from the thermostat, detect that at least one particular fault condition of the plurality of fault conditions has been resolved; and
clear the at least one particular fault condition of the plurality of fault conditions.

2. The system of claim 1, wherein, in response to receiving the second signal from the push button input device, the controller is configured to clear a soft-lockout status or a hard-lockout status of each of the plurality of fault conditions that have been cleared.

3. The system of claim 1, wherein the display comprises two seven-segment display units, and wherein the lockout status indicator comprises a light-emitting diode (LED).

4. The system of claim 1, wherein the controller is configured to present each respective fault code based on a chronological order in which the HVAC system entered each respective fault condition of the plurality of fault conditions.

5. The system of claim 1, wherein the respective lockout status consists of a non-lockout status, a soft-lockout status, or a hard-lockout status of the corresponding respective fault condition, and wherein the controller is configured to illuminate the lockout status indicator in a solid manner to indicate the non-lockout status, in a blinking manner twice to indicate the soft-lockout status, and in a blinking manner three times to indicate the hard-lockout status.

6. The system of claim 1, wherein the controller is communicatively coupled to the thermostat, and wherein the controller is configured to operate the HVAC system in accordance with signals for heating or cooling operation provided by the thermostat.

7. A heating, ventilation, and air conditioning (HVAC) controller, comprising:
a user interface having a display, a push button user input device, and a lockout status indicator;
processing circuitry communicatively coupled to the user interface and configured to execute instructions stored in a memory to:
determine that an associated HVAC unit has entered a plurality of fault conditions;
present, on the display of the user interface, a respective fault code corresponding to each respective fault condition of the plurality of fault conditions in a looping serialized manner in response to receiving a first signal from the push button input device during a first time period after the controller has received a signal indicative of a request for compressor operation from a thermostat, wherein each respective fault code is presented for a fault code presentation duration followed by the display being deactivated for a rest duration;
control illumination of the lockout status indicator during the fault code presentation duration of each respective fault code to indicate a respective lockout status that corresponds to each respective fault code;
in response to receiving a second signal from the push button input device during a second time period after the controller has not received the signal indicative of the request for compressor operation from the thermostat, detect that at least one particular fault condition of the plurality of fault conditions has been resolved; and
clear the at least one particular fault condition of the plurality of fault conditions.

8. The HVAC controller of claim 7, wherein, in response to receiving the second signal from the push button input device, the controller is configured to remove a soft-lockout status or a hard-lockout status of each of the plurality of fault conditions that has been cleared.

9. The HVAC controller of claim 7, wherein the user interface comprises a plurality of dip switches configured to provide new configuration information regarding the HVAC unit, and wherein, in response to receiving the second signal from the push button input device, the processing circuitry is configured to:
clear configuration information for the HVAC system stored in the memory;
determine, based on respective positions of the plurality of dip switches, the new configuration information for the HVAC system; and
store, in the memory, the new configuration information for the HVAC system.

10. The HVAC controller of claim 7, wherein each respective fault code is presented based on a chronological order in which the HVAC system entered each of the plurality of fault conditions.

11. The HVAC controller of claim 7, wherein the lockout status indicator is illuminated in different manners to indicate a non-lockout status, a soft-lockout status, or a hard-lockout status for each respective fault code presented on the display.

12. The HVAC controller of claim 7, wherein the user interface consists essentially of:
the display having two seven-segment display units;
the lockout status indicator having a light;
the push button input device; and
a plurality of dip switches configured to provide configuration information related to the HVAC unit.

13. The HVAC controller of claim 7, wherein the controller is communicatively coupled to both the user interface and the thermostat, and wherein the controller is configured to operate the HVAC system in accordance with signals for heating or cooling operation by the thermostat.

14. A controller for a heating, ventilation, and air conditioning (HVAC) system comprising a tangible medium storing instruction executable by a processor, wherein the instructions comprise:
instructions to determine that the HVAC system has entered a plurality of fault conditions;
instructions to present, on a display of a user interface associated with the controller, a respective fault code corresponding to each respective fault condition of the plurality of fault conditions in a serialized manner in response to receiving a first signal from a push button input device of the user interface during a first time period after the controller has received a signal indicative of a request for compressor operation from a thermostat, wherein each respective fault code is presented for a fault code presentation duration, and the display is deactivated for a rest duration between each fault code presentation duration;
instructions to control illumination of a lockout status indicator associated with the controller during each fault code presentation duration in a manner that indicates a respective lockout status corresponding to each respective fault code presented on the display;
instructions to redetect whether any of the plurality of fault conditions of the HVAC system remain based on data received from sensors or devices communicatively coupled to the controller in response to receiving a second signal from the push button input device during a second time period after the controller has not received the signal indicative of the request for compressor operation from the thermostat; and
instructions to present, on the display, the respective fault code corresponding to each respective fault condition of the redetected plurality of fault conditions in the serialized manner when at least one of the plurality of fault conditions remains after redetecting.

15. The controller of claim 14, wherein the instruction comprise instructions to provide a control signal to resume normal operation of the HVAC system when none of the plurality of fault conditions remains after redetecting whether any of the plurality of fault conditions of the HVAC system remain.

16. The controller of claim 14, wherein the controller is associated with a plurality of dip switches configured to provide configuration information regarding the HVAC system, and the instructions comprise instructions to replace previous configuration information stored in memory circuitry of the controller with the configuration information provided by the plurality of dip switches, in response to receiving the second signal from the push button input device.

17. The controller of claim 14, wherein the instructions comprise instructions to remove a soft-lockout status or a hard-lockout status of particular fault conditions of the plurality of fault conditions, in response to receiving the second signal from the push button input device and when the particular fault conditions have been cleared.

18. The controller of claim 14, wherein the instructions comprise instructions to control illumination of the lockout status indicator in a first manner to indicate that a presently presented fault code has a non-lockout status, in a second manner to indicate that the presently presented fault code has a soft-lockout status, and in a third manner to indicate that the presently presented fault code has a hard-lockout status.

19. The controller of claim 14, wherein the instructions to determine that the HVAC system has entered the plurality of fault conditions comprise:
instructions to receive a sensor signal from at least one of the sensors or devices; and
instructions to determine that the HVAC system has entered the plurality of fault conditions based on the sensor signal.

20. The system of claim 1, wherein the controller is configured to detect that the at least one particular fault condition of the plurality of fault conditions has been resolved based on sensor signals transmitted from one or more sensors communicatively coupled to the controller.

21. The system of claim 1, wherein the first signal from the push button input device comprises a first press duration that is less than a predetermined threshold time period, and wherein the second signal from the push button input device comprises a second press duration that is greater than the predetermined threshold time period.

22. The system of claim 1, wherein the plurality of fault conditions comprises at least one configuration error and at least one sensor-based fault condition, and wherein the at least one particular fault condition of the plurality of fault conditions comprises the at least one configuration error.

23. The system of claim 1, wherein the controller is configured to present, on the display of the user interface, configuration data of the HVAC system in response to receiving a third signal from the push button input device during a third time period after the controller determines that each fault condition of the plurality of fault conditions is cleared.

\* \* \* \* \*